United States Patent [19]

Dickey et al.

[11] 4,231,656
[45] Nov. 4, 1980

[54] APPARATUS AND METHOD OF CONVERTING AN IMAGE ON A TRANSPARENCY TO LINE ART ON A RECORDING MEDIUM

[75] Inventors: Fred M. Dickey, Derby; Jerry R. White; James Crill, both of Wichita, all of Kans.

[73] Assignee: The Boeing Company, Seattle, Wash.

[21] Appl. No.: 24,740

[22] Filed: Mar. 28, 1979

[51] Int. Cl.³ .............................................. G03B 27/72
[52] U.S. Cl. ............................... 355/71; 350/162 SF; 354/4; 355/77
[58] Field of Search ................. 355/77, 71, 67; 354/4; 350/162 SF, 162 R

[56] References Cited

U.S. PATENT DOCUMENTS

| | | | |
|---|---|---|---|
| 3,536,377 | 10/1970 | Lowenthal | 350/162 SF |
| 3,719,127 | 3/1973 | Mueller | 350/162 SF |
| 3,821,794 | 6/1974 | Yoneyama | 350/162 SF |
| 3,977,771 | 8/1976 | Horner | 350/162 SF |
| 4,000,949 | 1/1977 | Watkins | 350/162 SF |

*Primary Examiner*—Richard A. Wintercorn
*Attorney, Agent, or Firm*—Edwin H. Crabtree

[57] ABSTRACT

An apparatus and method of converting an image on a transparency such as photographic film to line art on a recording medium so that the line art may be microfilmed. The invention, through the use of optical processing techniques, greatly simplifies the conversion of continuous tone and half tone photographs to line art which heretofore had to be manually traced prior to microfilming the line art.

12 Claims, 6 Drawing Figures

APPARATUS AND METHOD OF CONVERTING AN IMAGE ON A TRANSPARENCY TO LINE ART ON A RECORDING MEDIUM

BACKGROUND OF THE INVENTION

The subject invention relates generally to an apparatus and method of converting an image on a transparency to line art and more particularly, but not by way of limitation, to the use of photographic film wherein the image on the film is optically converted to line art on a recording medium for microfilming the line art.

In U.S. Pat. No. 3,828,356 to Wiers a device is disclosed wherein an optical system performs a spatial fourier transform of recorded data. Also the use of a laser in an optical system for providing a beam of high energy light is disclosed in U.S. Pat. No. 3,556,661 to Hepner, U.S. Pat. No. 2,920,951 to Chovan, and U.S. Pat. No. 2,924,066 to Shapelle.

None of the above mentioned patents disclose the unique combination of structure for producing line art from an image on a transparency and the method as described herein.

The United States military along with commercial users of technical manuals have begun to require microfilming of the manuals so that these documents may be more easily stored. The half tone photographic process presently used for illustration in these manuals is not suitable for microfilming. Therefore, the solution in microfilming full tone and half tone photographs was solved by the manual tracing of the photographs of interest. It can be appreciated that this technique required substantial drafting time and costs involved to meet the microfilming requirements. The subject invention through optical processing techniques eliminates substantial drafting time in the conversion of continuous tone and half tone photographs to line art for microfilming.

SUMMARY OF THE INVENTION

The subject invention converts continuous tone photographs, half tone photographs, images on transparencies, ziptone photographs, and the like to line art on a recording medium such as photographic film.

The invention greatly reduces the need of manually tracing an image from a transparency for microfilm requirements. Because of the reduction of drafting time required in tracing line art, substantial cost savings is achieved. Also reduced labor requirements are made in converting technical manuals to microfilm.

Through the use of a combination of photographic techniques and fourier optical filtering, high quality line are is produced from an image on a transparency with a miminum of touch up drafting required.

The apparatus for converting an image on a transparency to line art on a recording medium includes a high intensity light source disposed on an optical alignment base. The high intensity light source may be a laser or other light source with the requisite characteristics. Positioned in front of the light source is a neutral density filter system for controlling the intensity of the light beam. Also a shutter may be located in front of the filter or on the light source for controlling the duration of the emission of the light beam therefrom. A collimator is disposed on the base and receives and expands the light beam. The beam from the collimator is directed through a transparency containing an image. The transparency is held on a transparency holder disposed on the base.

The beam transmitted by the transparency is directed through a first fourier transform lens for providing a spatial frequency distribution of the image at the focal plane of the lens. A filter holder having filters mounted thereon is positioned at the focal plane of the first fourier transform lens for receiving the spatial frequency distribution of the image in the beam. The selected filter on the filter holder removes undesirable spatial frequencies present in the image and modifies the amplitude of the remaining spatial frequencies of the image. A second fourier transform lens receives the filtered transformed beam and reconstructs the filtered image of the beam from the remaining spatial frequencies. The reconstructed beam is then directed through a relay lens which regulates the size of the beam prior to exposing the beam on a recording medium. The recording medium is held on a recording medium holder disposed on the base.

The advantages and objects of the invention will become evident from the following detailed description of the drawings when read in connection with the accompanying drawings which illustrate preferred embodiments of the invention.

DETAILED DESCRIPTION OF THE DRAWINGS

Figure 1:
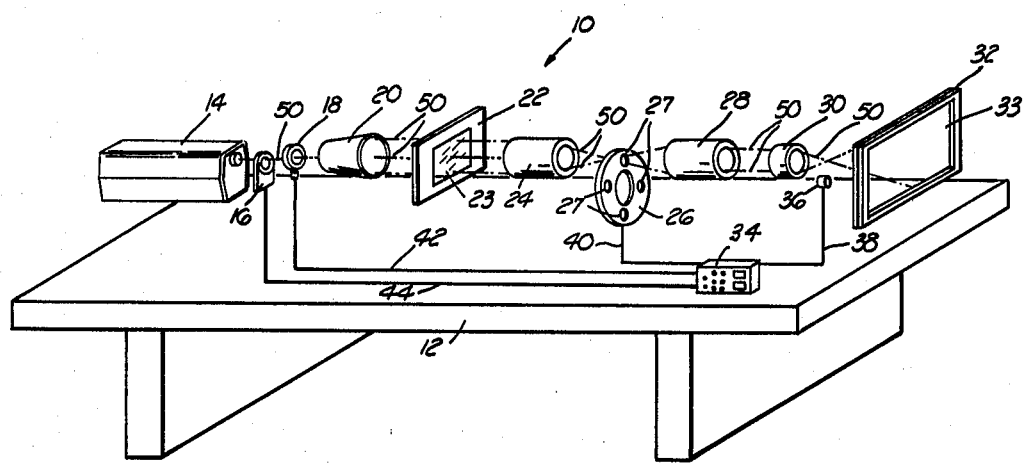
FIG. 1 is a perspective view of the apparatus used in converting a transparency with an image thereon to line art on a recording medium.

In FIG. 1 the apparatus for converting an image on a transparency to line art on a recording medium is designated by general reference numeral 10. The apparatus 10 is shown disposed above a base such as an optical table 12. While the optical table 12 is shown it should be appreciated that the apparatus 10 could be mounted in an enclosed housing or any other suitable structure for properly aligning the individual parts of the apparatus 10. The apparatus 10 includes a high intensity light source 14, a neutral density filter 16, a shutter 18, a collimator 20, a transparency holder 22 having a transparency 23 with an image thereon, a first fourier transform lens 24, a filter holder 26 having a plurality of filters 27 mountable thereon, a second fourier transform lens 28, a relay lens 30 and a recording medium holder 32 having a recording medium 33.

The apparatus 10 further includes a control panel 34 wired to a power meter 36 by electric lead 38. The power meter 36 acts as an exposure meter. The control panel 34 is also wired to the filter holder 26 by electric lead 40, wired to the shutter 18 by electric lead 42 and wired to the neutral density filter 16 by electric lead 44. The control panel 34 is used for electrically adjusting the neutral density filter 16, opening and closing the shutter 18 and rotating the filter holder 26 for the proper selection of the filters 27 mounted thereon. The filters 27, while not described in this application, are discussed in detail in a publication entitled Laser Line Art. Also the theory behind the construction of the filters is described and further details are referenced in this publication. This publication was delivered to the Society of Photo Optical Instrumentation Engineers at an annual technical symposium, San Diego, California in August of 1978. The authors of this publication are the same as the inventors of the subject invention.

In operation the high intensity light source 14 may be a laser beam or other light source with the requisite characteristics which directs a light beam outwardly therefrom. The light source 14 is attenuated with the neutral density filter 18 for regulating the intensity of the beam. In FIG. 1 the beam is shown as a dotted line 50. The light beam 50 is controlled by the shutter 18 which may be part of the high intensity light source 14 or as shown in FIG. 1, may be a separate shutter disposed between the neutral density filter 16 and the collimator 20. When the shutter 18 is open, the beam 50 is received by the collimator 20 and expanded. When the expanded light beam 50 is discharged from the collimator 20 it is received through the transparency holder 22 holding the transparency 23 with an image thereon. The transparency 23 may be a film negative, a film positive, or the like. The transparency 23 may also be a conventional continuous tone photograph, half tone photograph, ziptone photograph, or merely any type of transparency with an image thereon. When the beam 50 is received on the transparency 23 the image is illuminated and the resulting beam as modified by passing through the transparency image is received by the first fourier transform lens 24. The lens 24 provides a spatial frequency distribution of the image in the illuminated beam 50 at the focal plane of the lens located between the fourier transform lenses 24 and 28. This spatial frequency distribution is directed onto one of the filters 46 on the filter holder 26 for removing undesirable spatial frequencies of the image and modification of the amplitude of the remaining spatial frequencies. The remaining spatial frequencies in the image are transmitted by the filter and are received in the second fourier transform lens 28 where the image is reconstructed. The reconstructed image is then passed through the relay lens 30 for regulating the size of the image prior to exposing the image in the beam 50 on the recording medium 33 on the recording medium holder 32.

Figure 2:
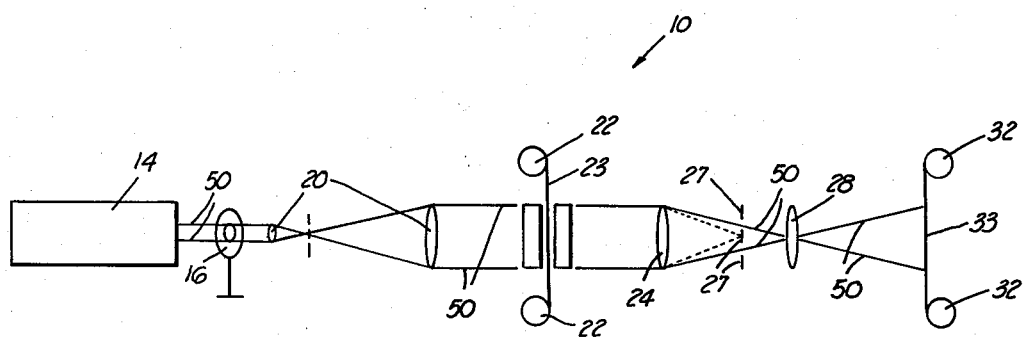
FIG. 2 is a schematic of the apparatus shown in FIG. 1.

In FIG. 2 a schematic of the apparatus 10 is shown in a simplified construction. In this view the high intensity light source 14 directs the beam 50 through the shutter 16 where it is received through the collimator 20 shown as a pair of lenses for expanding the beam 50. The expanded beam 50 is then directed through the transparency holder 22. The image on the transparency 23 held by the transparency holder 22 is then directed in the beam 50 through the first fourier lens 24 and through one of the filters 27 mounted on the filter holder 26. The beam 50 is then transmitted through the second fourier lens 28 and directed on the recording medium 33 such as unexposed film held in a film pack.

Figure 3:
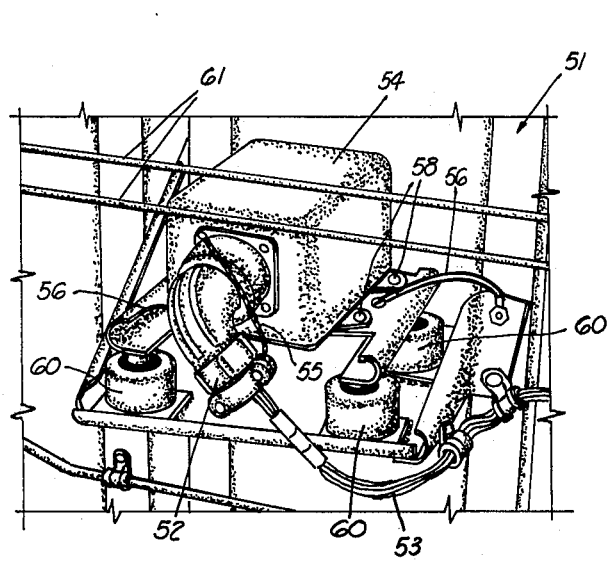
FIG. 3 is an example of a half tone photograph.

In FIG. 3 and example of a half tone photograph 51 is depicted illustrating an electrical connector 52 having wiring 53 and a safety wire 55 attached to a group rack selector 54. The selector 54 is mounted on a base 56. The base 56 is positioned on top of four shock mounts 60. Disposed in front of the selector 54 are cables 61. The photograph 51 is shown to illustrate a typical half tone photograph or a full tone photograph where it is desired to convert the photograph 51 to line art and subsequent microfilming of the technical subject matter.

Figure 4:
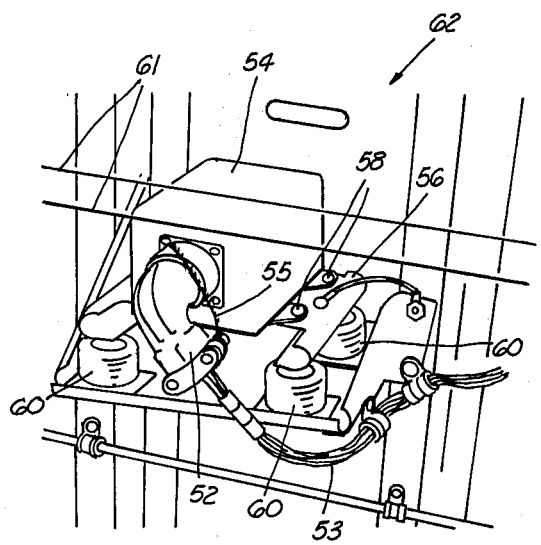
FIG. 4 is a manually traced line art reproduction of the half tone photograph shown in FIG. 3.

In FIG. 4 the photograph 51 has been converted manually to a line art drawing 62. By studying FIG. 4 it can be seen that while not all of the detail is shown as in FIG. 3, sufficient detail is provided so that the required information for descriptive purposes is retained and it can be microfilmed. The time required for manually converting the half tone photograph 51 of this type to the line art 62 would be in the range of three to four hours depending on the detail required; less wherein only a small amount of detail is required and more time where greater detail is required.

Figure 5:
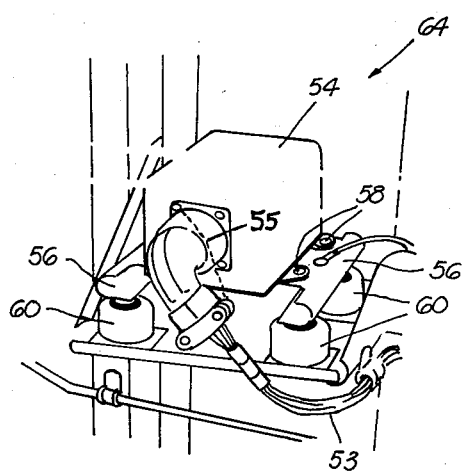
FIG. 5 is a line art reproduction of the half tone photograph shown in FIG. 3 using the apparatus shown in FIGS. 1 and 2.

In FIG. 5 an unretouched line art reproduction 64 of the half tone photograph 51 is shown produced from the apparatus 10. By comparing the line art reproduction 64 of FIG. 5 with the manually produced line art drawing 62 of FIG. 4, it can be appreciated that the detail is not as great, but is sufficient for retouching as depicted in FIG. 5A.

Figure 5A:
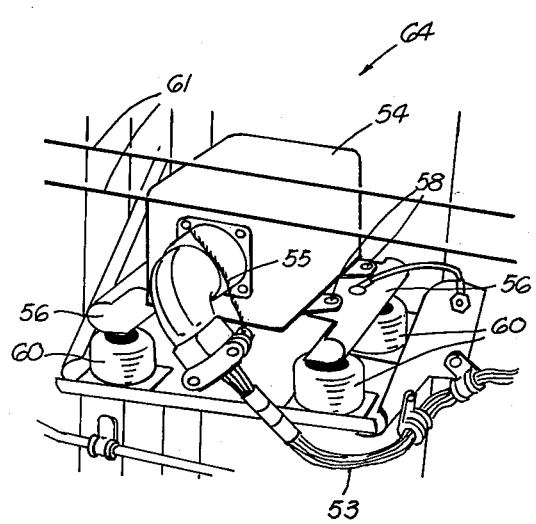
FIG. 5A is a retouched line art reproduction of the line art reproduction shown in FIG. 5.

In FIG. 5A the retouched line art reproduction 64 of the line art produced by apparatus 10 in FIG. 5 is shown. In the retouched line art of FIG. 5A it can be seen that sufficient detail is now provided for descriptive purposes and for microfilming therefrom. For example, the safety wire 55, electric wiring 53 and mounts 60 are enhanced and the cables 61 are added which did not show up in the original reproduction 64.

It has been found that through the use of the apparatus 10 typically in the area of 67% of the time required in manually reproducing line art from a full tone or half tone photograph such as the photograph 51 is eliminated using the apparatus 10 shown in FIGS. 1 and 2. The line art reproduction 64 as shown in FIG. 5 is then quickly retouched for any detail left out and is then suitable for microfilming.

Changes may be made in the construction and arrangement of the parts or elements of the embodiments as described herein without departing from the spirit or scope of the invention defined in the following claims.

What is claimed is:

1. A method of converting an image on a transparency to line art on a recording medium, the steps comprising:
    directing a light beam outwardly from a high intensity light source;
    illuminating an image on a transparency with the beam;
    subjecting the illumination beam to a first fourier transform lens resulting in a spatial frequency distribution of the image in the illumination beam;
    filtering the spatial frequency distribution of the image in the beam for removing undesirable spatial frequencies of the image and modification of the amplitude of the remaining spatial frequencies of the image;
    reconstructing the filtered image of the beam from the remaining spatial frequencies by subjecting the beam to a second fourier transform lens; and
    exposing the reconstructed image of the beam to a recording medium thereby producing line art from the original image on the transparency.

2. The method as described in claim 1 further including the step of filtering the beam with a neutral density filter for regulating the intensity of the beam prior to the step of illuminating the image on the transparency.

3. The method as described in claim 1 further including the step of expanding the beam size with a collimator prior to the step of illuminating the image on the transparency.

4. The method as described in claim 1 further including the step of regulating the size of the reconstructed image of the beam with a relay lens prior to the step of exposing the beam to the recording medium so that the desired size of the reconstructed image is produced on the recording medium.

5. The method as described in claim 1 further including the step of controlling the illumination of the image on the transparency with a shutter so that by opening the shutter the light beam is directed outwardly from the high intensity light source to illuminate the image on the transparency.

6. A method of converting an image on a transparency to line art on a recording medium, the steps comprising:
   directing a light beam outwardly from a high intensity light source;
   controlling the illumination of the light beam with a shutter so that by opening the shutter the light beam is directed outwardly therefrom;
   filtering the beam with a neutral density filter for regulating the intensity of the beam;
   expanding the beam size with a collimator;
   illuminating an image on a transparency with the beam;
   subjecting the illuminated beam to a first fourier transform lens resulting in a spatial frequency distribution of the image in the illuminated beam;
   filtering the spatial frequency distribution of the image in the beam for removing undesirable spatial frequencies of the image and modification of the amplitude of the remaining spatial frequencies of the image;
   reconstructing the filtered image of the beam from the remaining spatial frequencies by subjecting the beam to a second fourier transform lens;
   regulating the size of the reconstructed image of the beam with a relay lens; and
   exposing the reconstructed image of the beam to a recording medium thereby producing line art from the original image on the transparency.

7. An apparatus for converting an image on a transparency to line art on a recording medium, the apparatus comprising:
   an optical base;
   a high intensity light source disposed on said base, said light source directing a light beam outwardly therefrom;
   a transparency holder disposed on said base, said holder holding a transparency with an image thereon, said holder positioned in front of the light beam so that the light beam is directed through the transparency;
   a first fourier transform lens disposed on said base and positioned in front of said holder for receiving the beam therethrough;
   a filter holder having a filter mounted thereon disposed on said base and positioned in front of said first fourier transform lens, said filter filtering the spatial frequency distribution of the image in the beam for removing undesirable spatial frequencies of the image and modifying the amplitude of the remaining spatial frequencies of the image;
   a second fourier transform lens disposed on said base, and positioned in front of said filter for receiving the filtered image of the beam transmitted therethrough and reconstructing the filtered image from the remaining spatial frequencies; and
   a recording medium holder disposed on said base, and positioned in front of said second lens for exposing the reconstructed image on a recording medium held thereon, thereby producing line art from the original image on the transparency.

8. The apparatus as described in claim 7 further including a neutral density filter disposed on said base and positioned between said light source and said transparency holder for regulating the intensity of the beam.

9. The apparatus as described in claim 7 further including a collimator disposed on said base and positioned between said light source and said transparency holder for expanding the size of the beam.

10. The apparatus as described in claim 7 further including a shutter disposed on said base and positioned in front of the light source.

11. The apparatus as described in claim 7 further including a relay lens disposed on said base and positioned between said second fourier transform lens and said recording medium holder, said relay lens regulating the size of the reconstructed image of the beam.

12. An apparatus for conventing an image on a transparency to line art on a recording medium, the apparatus comprising:
   a base;
   a high intensity light source disposed on said base, said light source directing a light beam outwardly therefrom;
   a neutral density filter disposed on said base and positioned in front of the light source for regulating the intensity of the beam;
   a shutter disposed on said base and positioned in front of said neutral density filter;
   a collimator disposed on said base and positioned in front of said shutter, said collimator used for expanding the size of the beam;
   a transparency holder disposed on said base, said holder holding a transparency with an image thereon, said holder positioned in front of the light beam so that the light beam is directed through the transparency;
   a first fourier transform lens disposed on said base and positioned in front of said transparency holder for receiving the beam transmitted therethrough;
   a filter holder having a filter mounted thereon disposed on said base and positioned in front of said first fourier transform lens, said filter filtering the spatial frequency distribution of the image in the beam for removing undesirable spatial frequencies of the image and modifying the amplitude of the remaining spatial frequencies of the image;
   a second fourier transform lens disposed on said base and positioned in front of said filter for receiving the filtered image of the beam transmitted therethrough and reconstructing the filtered image from the remaining spatial frequencies;
   a relay lens disposed on said base and positioned in front of said second fourier transform lens, said relay lens regulating the size of the reconstructed image of the beam; and
   a recording medium holder disposed on said base and positioned in front of said second lens for exposing the reconstructed image on a recording medium held thereon, thereby producing line art from the original image on the transparency.

* * * * *